Sept. 20, 1966  W. W. DOLLISON ETAL  3,273,589
LOW PRESSURE PILOT VALVE
Filed Nov. 20, 1961  2 Sheets-Sheet 1

INVENTORS:
DONALD F. TAYLOR, JR.
WILLIAM W. DOLLISON
BY
Mellin and Hanscom
ATTORNEYS Sept. 20, 1966 W. W. DOLLISON ETAL 3,273,589
LOW PRESSURE PILOT VALVE
Filed Nov. 20, 1961 2 Sheets-Sheet 2
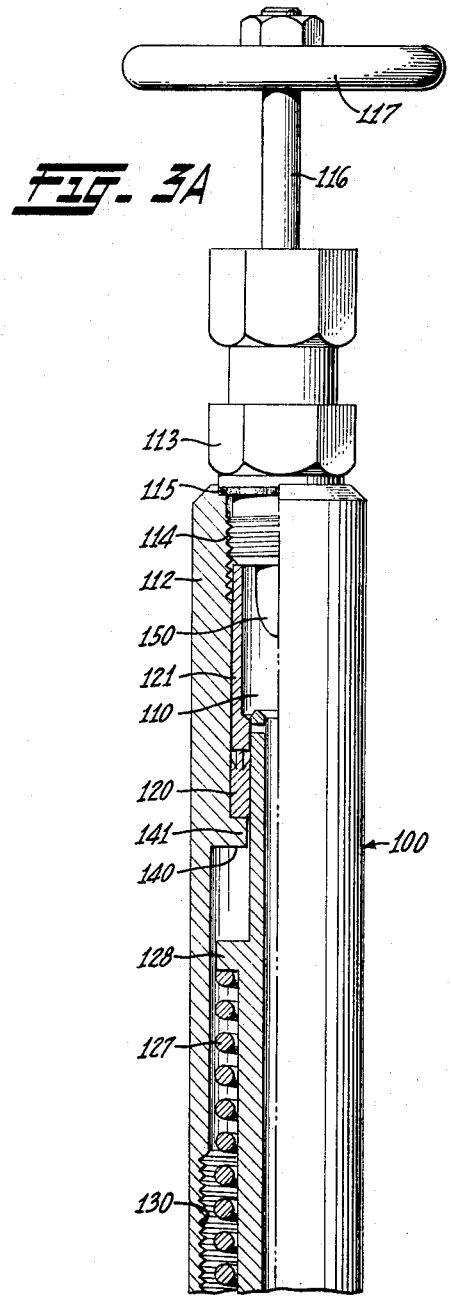
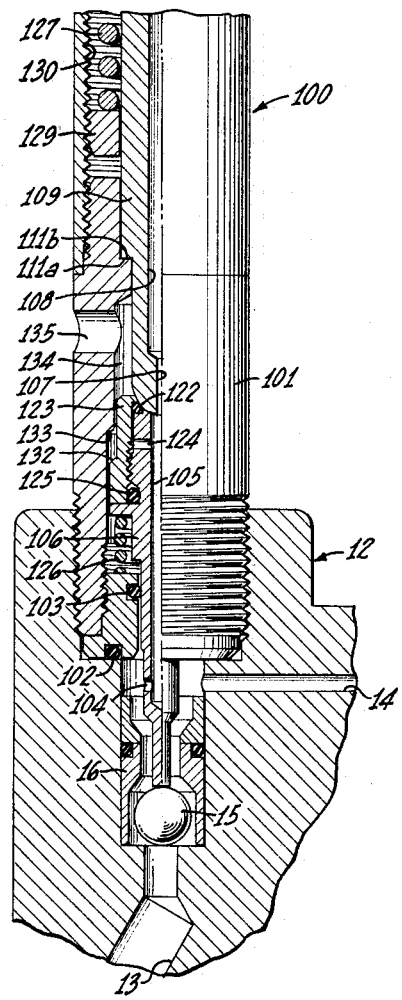
INVENTORS:
DONALD F. TAYLOR, JR.
WILLIAM W. DOLLISON
BY
Mellin and Hanscom
ATTORNEYS United States Patent Office 3,273,589
Patented Sept. 20, 1966

3,273,589
LOW PRESSURE PILOT VALVE
William W. Dollison, 1441 Larchmont, and Donald F. Taylor, Jr., 3555 Vancouver, both of Dallas, Tex.
Filed Nov. 20, 1961, Ser. No. 154,394
9 Claims. (Cl. 137—495)

This invention relates to surface safety valves and more particularly to an improved pilot valve therefor which responds to a predetermined low-pressure condition.

Although it may find utility elsewhere, this improved pilot valve is primarily intended for use as an accessory on that type of fluid pressure device such as the surface safety valve which is described and illustrated in U.S. Patent No. 2,973,005 to William W. Dollison and Phillip S. Sizer. In this type of safety valve, a spring maintains a main ball valve member in its open position to permit flow through the main passage of the safety valve. The spring is disposed in an annular chamber which communicates with the main flow passage upstream of the ball valve member through an auxillary passageway. The main valve will remain open by the upstream pressure as long as the spring chamber communicates with the main passage. A ball check valve is disposed in the auxiliary passageway and is held off its seat by some form of operating device to permit and maintain said communication. The main valve is caused to close by exhausting the spring chamber to atmosphere and, at the same time, permitting the ball check to go on to its seat to shut off the main flow passage pressure from the spring chamber.

Hereto, expensive accessories have been required in order to cause this type of safety valve to close in response to a predetermined low-pressure condition.

It is therefore one object of this invention to provide a pilot valve which is automatically actuated when the pressure applied thereto falls to a predetermined level and which is economical to manufacture.

Another object of this invention is to provide a low pressure pilot which maintains the main valve in closed position after the closing thereof, but which is simple and easy to reset after having been actuated.

Other objects will become apparent from reading the following description and studying the accompanying drawing wherein:

FIGS. 3A and 3B are continued views partly in elevation and partly in section showing another embodiment of this invention.

Figure 1:
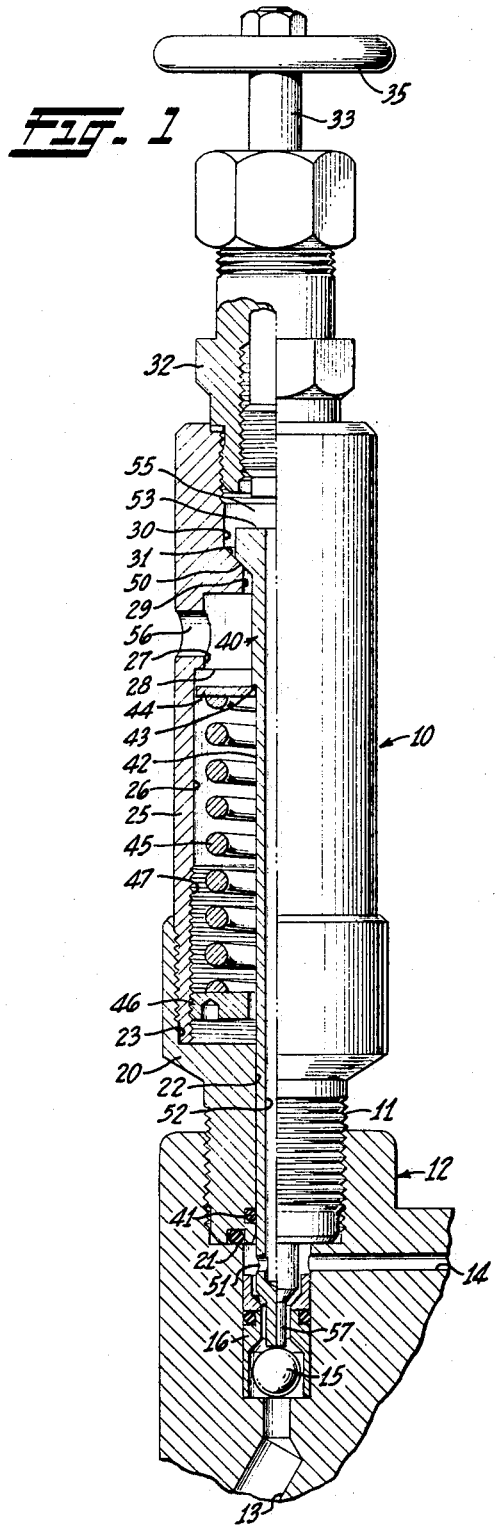
FIG. 1 is a view partly in evelation and partly in section with some parts broken away showing an embodiment of the invention during normal operation.

Referring now to FIG. 1, the pilot valve of this invention, indicated generally by the numeral 10, is shown mounted as by thread 11 on a fluid pressure device, or safety valve 12, which is of the type disclosed in the above mentioned U.S. Patent No. 2,973,005.

Safety valve 12 is provided with a passageway 13 which is intersected by passageway 14. Fluid pressure from the main flow passage (not shown) of safety valve 12 passes through passageways 13 and 14 to pressurize an annular spring chamber (not shown) to assist the spring therein in maintaining the main valve member (not shown) in an open position, permitting the flow of fluids through the conduit in which the safety valve is installed. A drastic reduction in pressure in the spring chamber, as may be brought about by venting or exhausting passageway 14 to the atmosphere, results in the ball valve member being moved by fluid pressure to its closed position to stop the flow of fluids through the conduit. Repressuring of passageway 14, and therefore of the spring chamber to which passageway 14 communicates, causes the ball valve member to return to its open position. Thus safety valve 12 can be opened and closed repeatedly by alternately pressurizing and exhausting its spring chamber. To make the operation of the safety valve more efficient and to prevent the needless loss or escape of fluids, a ball check valve 15 and seat 16, respectively, are provided in passageway 13 so that passageway 13 can be closed when passageway 14 is vented and opened again when the vent is closed. The pilot valve 10, as will be explained, causes the safety valve to close when the pressure in the valve falls to a predetermined low level and permits only non-automatic reopening of the safety valve.

Low pressure pilot valve 10 is composed of a housing or body 20 which is threadedly connected to the body of safety valve 12 downstream of check valve seat 16, the connection being made fluid tight by a seal such as O-ring 21. Body 10 is provided with a central bore 22, the upper portion of which is enlarged as at 23 and threaded to receive the tubular spring housing 25.

The spring housing 25 is provided with bore 26 which is reduced as at 27 to provide an abrupt downwardly facing shoulder 28 and which is further reduced at 29. Bore 29 is enlarged at 30 providing an upwardly and outwardly flaring shoulder or valve seat 31. Bore 30 is threaded to receive bonnet 32 in which valve stem 33 is disposed. Valve stem 33 is threadedly engaged in bonnet 32 so that by turning the handle 35, the stem can be made to advance upwardly or downwardly as desired.

As may be seen, the pilot valve 10 may be considered as having a housing member comprised of members 20 and 25 through which a bore, made up of bore portions 22, 26, 27, 29, 30 and 31, extends. This bore is open at the lower end of bore portion 22 and is closed at its other end by bonnet 32.

Plunger 40 is disposed within spring housing 25 with its lower portion extending through bore 22 of body 20. O-ring 41 seals between the body and the valve as shown.

Near its upper end, plunger 40 is reduced at 42 to provide a downwardly facing shoulder 43 engageable by spring guide 44 which is biased upwardly by the compression of spring 45. The load of the spring can be varied as desired by turning adjusting screw 46 to advance it along thread 47 of spring housing 25 in either an upwardly or downwardly direction relative thereto.

Plunger 40 is enlarged at its upper end to provide a downwardly facing conical valve surface 50 which cooperates with the complementary shaped seat surface 31 of spring housing 25 to permit or prevent the venting of fluids from the pilot as will be explained later.

Figure 2:
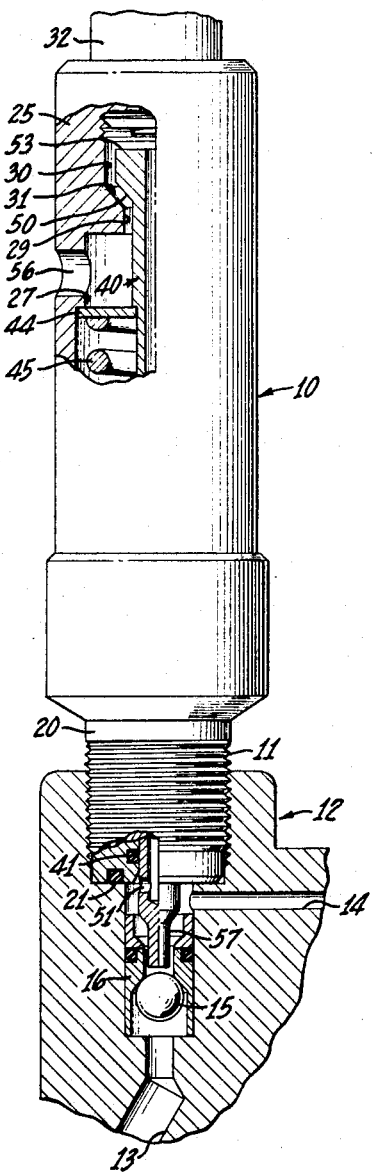
FIG. 2 is a view showing the device of FIG. 1 after it has been actuated.

Near its lower end, plunger 40 is provided with lateral aperture 51 which communicates with blind bore 52 extending from this point to the upper end surface 53 of the valve. Thus fluids entering the valve through aperture 51 may pass upwardly through blind bore 52 and, when the valve and seat surfaces 50 and 31 of the plunger and spring housing, respectively, are in fluid-tight engagement, pressurize chamber 55. Otherwise, i.e., when the valve is unseated, as shown in FIG. 2, fluids issuing from the upper end of plunger bore 52 are free to escape to the atmosphere through bores 29 and 27 and lateral aperture 56 of the spring housing.

Plunger 40 is further provided with a reduced diameter portion 57 at its lower end which, when the plunger is in its lower position, projects through the bore of seat 16 to hold ball 15 in its unseated or open position, permitting fluids to pass from passageway 13, around ball 15, and through seat 16. From there these fluids may pass through passageway 14 into the spring chamber of the safety valve 12 and they may also pass through lateral aperture 51 and bore 52 of the plunger to pressurize chamber 55 as before explained.

The pressure existing in the device acts across the area sealed by O-ring 41 tending to force plunger 40 to its upper or open position. Combined with this force is the force of spring 45 which also tends to unseat the plunger. These combined forces are opposed by the force of the pressure in chamber 55 acting across the area of seat 31 which is sealed by valve surface 50. Since this latter force is normally greater than the other two forces combined, the valve will remain closed, as shown in FIG. 1.

If, however, the pressure in chamber 55 falls below that for which the load of spring 45 has been previously adjusted, then the spring load becomes sufficiently strong to move plunger 40 to its upper position, shown in FIG. 2, wherein spring guide 44 comes to bear against downwardly facing shoulder 28 of the spring housing 25.

When valve 50 is unseated, the main safety valve fluids begin to flow from passageways 13 and 14 up through lateral aperture 51 and bore 52 of plunger 40, and through bores 29 and 27 and lateral aperture 56 of the spring housing to be exhausted into the atmosphere. Thus fluids begin flowing upwardly through check valve seat 16 and, as soon as plunger tip 57 moves upwardly out of the way, ball 15 is forced into intimate contact with seat 16 and flow through the check valve ceases. This now permits passageway 14, and therefore the annular spring chamber of the safety valve, to exhaust through pilot valve 10, causing the safety valve to close, and stopping the flow of fluids through the conduit in which the safety valve is disposed.

It should be readily apparent that increasing the loading of spring 45 as by screwing adjusting screw 46 upwardly will cause the pilot to exhaust at a higher pressure and that decreasing the load of the spring as by screwing the adjusting screw downwardly will cause the pilot to exhaust at a lower pressure. Thus, the device can be adjusted to operate at the desired pressure value. The range of adjustments can be greately extended by using springs of varying lengths and rates.

After closing, the safety valve will remain closed until reopened intentionally.

To open the safety valve, handle 35 is rotated to run stem 33 downwardly so that plunger 40 is returned to its lower position through engagement of the lower end of stem 33 with upper end surface 53 of the valve plunger. This action not only forces seat surface 50 of the plunger into fluid-tight engagement with seat surface 31 of the housing to discontinue communication of chamber 55 with the atmosphere through lateral aperture 56 as before explained, but it also forces ball 15 to its lower position, shown in FIG. 1, thus permitting passageway 13, the source of pressure, to communicate with the annular spring chamber of the safety valve through passageway 14. In this condition, the safety valve will remain open regardless of however low the pressure at the time might be.

After the pressure has returned to a level above that for which the pilot is set, stem 33 may be safely retracted to its normal position shown in FIG. 1. The pilot is now reset and ready to cause automatic closing of the safety valve should the pressure at any time fall below the level for which adjustment has been made.

Should stem 33 be retracted before the pressure has returned to a level above the setting of the pilot, the safety valve will close since its spring chamber will be immediately exhausted.

A further embodiment of the pilot valve of this invention is generally indicated by numeral 100 in FIGS. 3A and 3B. Its operation is very similar to the device of the first embodiment. The pilot valve body 101 is fastened to a safety valve 12 so that ball 15 of the safety valve is normally held off its seat 16 as in the previous embodiment.

In its normal, dormant or closed condition, well fluids under pressure move upwardly around the ball 15 and through ball seat 16 of the safety valve but due to seal rings 102 and 103 cannot escape except by passing through lateral aperture 104 into bore 105 of valve seat 106.

The well fluids under pressure move upwardly in bore 105 and pass through restricted bore 107 and enlarged bore 108 of valve 109 to be trapped in chamber 110 above the valve.

The valve seat 106 and valve member 109 together constitute a plunger in which the plunger parts can move upwardly and downwardly in unison through a limited distance.

The upper end of housing 112 is closed by bonnet 113 held as by thread 114 and sealed by gasket 115. Seating stem 116 having handle 117 secured thereto is disposed in bonnet 113 as shown, for a purpose to be disclosed later.

Well fluids cannot escape from the pilot valve 100 at this time since packing 120 which is held in place by spacer 121 and which is supported by internal flange 141, seals between the upper end of valve 109 and housing 112. Also, the pressure in chamber 110 holds valve 109 on its seat 106 to prevent well fluids from escaping between the valve and seat. To provide a superior seal at this point, seal ring 122 is disposed about the upper end of valve seat member 106 and is held in place by valve seat cap 123 which is screwed onto the valve seat as shown. Lateral aperture 124 permits fluid pressure from bore 105 of the seat to act as on the underside of seal ring 122. Of course, the provision of lateral aperture 124 necessitates the use of seal ring 125 to make the seat and cap arrangement fluid tight. Spring 126 is disposed about the valve seat to bias it upwardly, thus always assuring an intimate contact between the valve and seat. The downward movement of valve 109 is limited by the engagement of its downwardly facing shoulder 111a with a corresponding upwardly facing shoulder 111b formed in body 101 as shown.

Spring 127 is disposed about valve 109 with its upper end bearing against the lower side of external flange 128 formed on the valve and with its lower end bearing against the upper end of adjusting nut 129. Adjusting nut 129 can be moved up or down by thread 130 to provide the desired compression in spring 127.

While the pressure in chamber 110 acts downwardly against the cross-sectional area of valve 109 sealed by seal ring 120, the same pressure acts upwardly against the area of the lower spherical end of the valve which is sealed by seal ring 122. Also, spring 127 biases valve 109 upwardly, tending to separate the valve and seat.

As long as the pressure in chamber 110 is sufficiently high the valve will remain on seat 106 and the safety valve 12 will remain open. But, when the pressure in the safety valve and, therefore, in chamber 110 falls below the value for which spring 127 has been set, the spring forces valve 109 upwardly.

As valve 109 moves upwardly, seat 106 moves with it until upwardly facing shoulder 132 of the seat cap 123 engages downwardly facing shoulder 133 of body 101 to prevent further upward movement of the seat.

Continued upward movement of valve 109 results in its separation from seat 106 and permits well fluids to escape therebetween into annulus chamber 134 and from thence through exhaust port 135 to the atmosphere. The flow of well fluids thus created causes ball check valve 15 to become seated against seat 106 of the safety valve 12 and permits the spring chamber of the safety valve to exhaust through passageway 14, lateral aperture 104, bore 105, chamber 134 and exhaust port 135, which actions cause closing of the safety valve.

Upward movement of valve 109 is arrested either by the upper side of its external flange 128 engaging the under side 140 of internal flange 141 of housing 112 or by the upper end of valve 109 engaging the lower end of seating stem 116.

Once actuated, the pilot valve remains open, the spring chamber of the safety valve remains in communication with the atmosphere, the safety valve 12 remains closed, and ball check valve 15 prevents the escape of well fluids.

The pilot will not automatically reset itself; however, it may be readily reset by hand.

To reopen the safety valve 12, handle 117 is operated to screw seating stem 116 downwardly. The tip 150 of stem 116 pushes valve 109 down to contact seat 106. Continued operation of handle 117 forces seat 106 downwardly to unseat ball 15 and permit well fluids to repressure the safety valve spring chamber through passageway 14. Repressuring of the spring chamber reopens the safety valve.

During the lowering of valve 109, well fluids cannot escape from the pilot because the valve seats against its seat 106 before the lower end of the seat can force ball 15 from its seat.

If at this time the pressure in the pilot is still below that for which adjustment has been made, valve 109 can be left locked in its lower position and the pilot will be out of service, enabling the safety valve to remain open.

To return the pilot to service, handle 117 is rotated to unscrew seating stem 116 to its upper position as shown in FIGURE 3A. Then, should the pressure in the safety valve thereafter fall below the pilot setting, the pilot will actuate and the safety valve will close.

Thus it has ben shown that either embodiment of this invention can be used to cause a safety valve to close when the pressure therein falls to a predetermined level and that said safety valve can be caused to reopen simply by rotating the stem handle 35 or 117, as the case may be, thus accomplishing the objects of the invention.

It is to be understood that the forms of the invention herewith shown and described are to be taken as preferred embodiments of the same and that various changes may be made in the shape, size and arrangement of parts, without departing from the spirit of the invention or the scope of the attached claims.

Having thus described our invention, what we claim and desire to secure by Letters Patent is:

1. A pilot valve for use with a fluid pressure device having a passageway, a valve seat in said passageway and a ball check valve seatable on said valve seat by fluid pressure upstream of said valve seat, said pilot valve comprising: a housing having a bore therein closed at one end and open at the other end thereof, said housing being adapted to be connected to said fluid pressure device so that the open end of said bore is in fluid communication with said passageway downstream of said valve seat, a plunger disposed in said bore for axial movement between first and second positions therein, said plunger being adapted to engage said ball valve to unseat said ball check valve when said plunger is in its first position and to allow said ball check valve to be seated when said plunger is in its second position, first and second seal means sealing between said plunger and bore at spaced apart points adjacent said open and closed ends of said bore respectively, the area sealed by said first seal means being less than the area sealed by said second seal means, passage means fluidly communicating the open and closed ends of said bore, spring means for resiliently biasing said plunger to its second position, and means for venting said open end of said bore through said housing to atmosphere when said plunger is in its second position.

2. In a pilot valve as set forth in claim 1 wherein said second seal means comprises an outwardly flaring valve surface on the exterior of said plunger and a valve seat formed in said bore complementary to and sealingly engageable by said valve surface.

3. In a pilot valve as set forth in claim 1 and wherein said plunger is provided with shoulder forming means between said first and second seals, a spring stop member encircling said plunger, said spring stop member being screw threaded to said bore for longitudinal movement of said bore, said spring means being a compression spring encircling said plunger and confined between said spring stop member and shoulder forming means.

4. A pilot valve as set forth in claim 1 wherein said passage means fluidly communicating the open and closed ends of said bore is formed through said plunger.

5. A pilot valve as set forth in claim 1 and further including reset means comprising a stem member extending from the closed end of said bore to the exterior of said housing, said stem member being screw threaded into said housing, said stem member being axially aligned with said plunger and being engageable with said plunger to move said plunger from its second to its first position by rotation of said stem member.

6. A pilot valve for use with a fluid pressure device having a passageway, a valve seat in said passageway and a ball check valve seatable on said valve seat by fluid pressure upstream of said valve seat, said pilot valve comprising: a housing having a bore therein closed at one end and open at the other end thereof, said housing being adapted to be connected to said pressure device so that the open end of said bore is in fluid communication with said passageway downstream of said valve seat, a plunger disposed for axial movement between first and second positions in said bore, said plunger being adapted to engage said ball check valve to unseat said ball check valve when said plunger is in its first position and to allow said ball check valve to seat when said plunger is in its second position, passage means fluidly communicating the open and closed ends of said bore through said plunger, said plunger comprising first and second axially aligned plunger parts with abuttable ends, first and second seal means slidably sealing between said first and second plunger parts and said bore adjacent said open and closed ends of said bore respectively, the area sealed by said first seal means being less than the area sealed by said second seal means, third seal means for sealing the abutting ends of said plunger parts when abutted, spring means for resiliently biasing both plunger parts towards the closed end of said bore, interengageable stop means on said plunger parts and said housing for arresting movement of said plunger parts towards the closed end of said bore so that when said plunger is in its second position the abuttable ends of said plunger parts are spaced apart, said housing having an opening from the exterior thereof to said bore intermediate said first and second seal means.

7. A pilot valve as set forth in claim 6 wherein said third seal means comprises a groove formed in the abuttable end of one of said plunger parts encircling said passage means through said plunger part and an O-ring disposed in said groove for engagement by the abuttable end of the other of said plunger parts, said one plunger part having a passageway therein fluidly communicating said passage means and said groove.

8. In a pilot valve as set forth in claim 6 and wherein said plunger is provided with shoulder forming means between said first and second seals, a spring stop member encircling said plunger, said spring stop member being screw threaded to said bore for longitudinal movement of said bore, said spring means being a compression spring encircling said plunger and confined between said spring stop member and shoulder forming means.

9. A pilot valve as set forth in claim 6 and further including reset means comprising a stem member extending from the closed end of said bore to the exterior of said housing, said stem member being screw threaded into said housing, said stem member being axially aligned with said plunger and being engageable with said plunger to move said plunger from its second to its first position by rotation of said stem member.

(References on following page)

References Cited by the Examiner

UNITED STATES PATENTS

| | | | |
|---|---|---|---|
| 744,777 | 11/1903 | Martin | 137—466 XR |
| 846,947 | 3/1907 | Purtle et al. | 137—466 |
| 1,772,406 | 8/1930 | Whiton | 137—505.18 |
| 2,688,975 | 9/1954 | Born | 137—464 X |
| 2,902,046 | 9/1959 | Dollison | 137—467 |
| 2,973,005 | 2/1961 | Dollison | 137—458 |

WILLIAM F. O'DEA, *Primary Examiner.*

M. CARY NELSON, ISADOR WEIL, *Examiners.*

D. ROWE, H. WEAKLEY, *Assistant Examiners.*